United States Patent [19]

Daghe et al.

[11] E Re. 29,253

[45] Reissued June 7, 1977

[54] VALVE OPERATOR FOR BUTTERFLY VALVES OR THE LIKE

[75] Inventors: Joseph L. Daghe, Decatur, Ill.; Richard A. Stultz, Franklin, Ohio

[73] Assignee: Mueller Co., Decatur, Ill.

[22] Filed: Apr. 12, 1976

[21] Appl. No.: 676,343

Related U.S. Patent Documents

Reissue of:

[64] Patent No.: 3,877,677
Issued: Apr. 15, 1975
Appl. No.: 448,715
Filed: Mar. 6, 1974

[52] U.S. Cl. ..... 251/228
[51] Int. Cl.² ..... F16L 27/02
[58] Field of Search ..... 74/89.15, 500, 509, 74/510, 109; 251/228, 229, 248, 250, 285, 233

[56] References Cited

UNITED STATES PATENTS

| | | | |
|---|---|---|---|
| 2,908,182 | 10/1959 | Bacchi | 74/89.15 X |
| 3,043,160 | 7/1962 | Killian | 74/89.15 X |
| 3,147,766 | 9/1964 | Herring et al. | 74/509 X |
| 3,385,120 | 5/1968 | Nott | 251/233 X |

*Primary Examiner*—Martin P. Schwadron
*Assistant Examiner*—G. L. Walton
*Attorney, Agent, or Firm*—Cushman, Darby & Cushman

[57] ABSTRACT

A valve operator for controlling the movement of a valve member carried by a rotatable valve shaft of a valve. The valve operator limits the movement of the valve member between a predetermined opened position and a closed position, the valve operator being adjustable without complete disassembly of the same to adjust the closing position of the member when necessary without affecting the overall amount of movement of the valve member as limit stops are operatively positioned on an operating shaft or stem of the valve operator with one of the stops being adjustable to axially move the operating shaft or stem and, thus, simultaneously adjust the other stop. Additionally, the valve operator is provided with coupling means for coupling the same to the rotatable shaft of the valve member, the coupling means being so arranged as to include a coupling sleeve which may be easily replaced by another coupling sleeve to accommodate the valve operator for valves having different diameter valve shafts. This latter feature also does not require the valve operator to be completely disassembled.

24 Claims, 4 Drawing Figures

VALVE OPERATOR FOR BUTTERFLY VALVES OR THE LIKE

Matter enclosed in heavy brackets [ ] appears in the original patent but forms no part of this reissue specification; matter printed in italics indicates the additions made by reissue.

The present invention relates to a valve operator adapted to be associated with a valve having a rotatable shaft for operating the valve member of the valve between predetermined opened and closed positions. While the valve operator is particularly adapted for use with valves, such as butterfly valves, it may be used with other types of valves having a rotatable valve shaft for opening and closing the valve member of the valves with a predetermined amount of movement.

BACKGROUND OF THE INVENTION

Mechanical valve operators have heretofore been used on valves having rotatable valve shafts requiring relatively large amounts of torque for opening and closing the same. These types of valve operators have been particularly useful on butterfly valves wherein such valves include a butterfly valve plate or member carried by a rotatable valve shaft, the valve plate or member being pivoted between a closed position across the flow passage of the valve body to an opened position substantially parallel to the axis of the flow passage in the valve body. Large torques result in these types of butterfly valves, especially when the valves are large in size and/or used in systems where the fluid pressure is high and, thus, there is the necessity of providing a mechanical valve operator designed to provide a mechanical advantage to overcome the large torques. Many of these mechanical valve operators are either of the type driven by an electric drive means or by a mechanical means, such as a wrench or handle, the valve operators having in common means to produce a mechanical advantage capable of rotating the rotatable valve shafts requiring large torques for operation.

Other types of valves use mechanical valve operators wherein such valves have a rotatable valve shaft and the valves require large torques for operation of the shaft to open and close the valve. In this respect, mechanical valve operators have been used on large size ball valves, plug valves, and even gate valves wherein reciprocation of the gate member is accomplished by rotary movement of a shaft.

Valve operators or operating mechanisms for attachment to valves having a rotatable valve shaft usually include a housing, an operating shaft journaled in the housing, the operating shaft having a screw thread thereon, and a follower or operator nut carried on the screw thread and movable between limits longitudinal of the operating shaft. The follower is operatively connected to the rotatable valve shaft of a valve member by a pivotal lever or bellcrank member, or the like, and when the follower moves on the operating shaft, the lever pivots causing the rotatable valve shaft to rotate between certain limits. Usually, the lever or bellcrank member is in the form of a bifurcated yoke member pivotally connected to the rotatable valve shaft, the bifurcated yoke member receiving the following member between its arm and having slots in its arms for receiving projecting pin members from follower members.

In prior art, the valve operators were provided with spaced stop means to limit the travel of the follower member or operating nut and, thus, limit the amount of rotation of the valve shaft to control the movement of the valve member attached to the shaft between an opened and closed position. Some of these prior valve operators had complicated means for adjusting the stop which controlled the position of the valve member in the closed position, whereas other of the valve operators had separate means to adjust the stops for both controlling the valve member in its opened and closed positions. The adjustment means of the prior art was usually quite complicated to operate, and if adjustment were made in the wrong direction, the procedure of adjustment had to be repeated over and over before a final position of the stops was obtained.

So far as known, none of the prior art valve operators utilizing stops for controlling the amount of movement of the valve member had means whereby both stops were simultaneously adjusted in the same direction so as to maintain a predetermined amount of movement between the valve closed and valve opened positions of the valve member. For example, in butterfly valves, the valve operator for such valves is initially installed on the butterfly valve and the adjustment of stops is made so that the butterfly valve member or disk completely seals against the seat and opens a predetermined distance, usually 90°, so as to be substantially parallel with the flow passage through the valve. Once this initial setting has been made and the butterfly valve is operated over a period of time, the valve seat for the disk might become worn and the valve might leak when in the closed position. This necessitates readjustment of the disk or butterfly valve member to seat properly and usually this adjustment is slight, but it does not affect the overall amount of movement of the valve member unless the valve open stop is also adjusted. In the prior art, this had to be done by a separate adjustment of the stop for limiting the movement of the follower nut in a direction for moving the valve member in opened position and this was difficult to obtain an accurate setting without complete disassembly of the valve operator.

The prior art valve operators were usually designed to be attached to a particular size valve having a particular size valve operating stem. In such situations where a valve operator was made for only one particular size valve operating stem or shaft, the manufacturer did not have too much flexibility in operation because the manufacturer had to have on supply a number of separate valve operators or mechanisms for each particular size of valve.

Prior art arrangements relating to valve operators or operating mechanisms are disclosed in the following U.S. Pat. Nos.

2,930,252 Sears et al. Mar. 29, 1960;
3,420,500 Geiselman, Jan. 7, 1969;
3,452,766 Fenster, July 1, 1969;
3,459,058 Fawkes, Aug. 5, 1969;
3,575,378 Fawkes, Apr. 20, 1971.

While some of the above-listed patents disclose adjustments for valve operators or operating mechanisms none of the patents suggest a solution to the problem where the adjustment of the valve member of a valve having a rotatable valve shaft can be made for the valve closed position without affecting the amount of overall movement of the valve member unless separate adjustment means are provided to further control the valve opened position after adjustment of the closed position. Further, none of the above patents suggest a simplified solution to the problem of making a valve operator or operating mechanism which is capable of use with various size valves having various size rotatable valve shafts.

BRIEF SUMMARY OF THE INVENTION

The present invention provides an improved valve operator mechanism for valves having rotatable valve shafts for operating the valves between limits of opened and closed positions, the valve operator mechanism being so designed that the valve closing position may be adjusted from time to time when there is evidence of valve seat wear and leakage of the valve in the closed position. By providing a valve operator mechanism which can be adjusted while attached to the valve and/or without complete disassembling the valve operator mechanism enhances the maintenance of the valve throughout its life.

While the valve operator mechanism of the present invention is capable of use on any type of valve having a rotatable valve shaft and requiring high torque to open and close the valve, it is particularly adapted for use on those valves known as "butterfly" valves which have an annular seat and a circular disk or vane type valve member rotated on a central cross shaft or valve shaft. This type of valve is usually quite large and used in situations where the fluid pressure in the fluid distribution system is quite high and, thus, requires large torques for rotating the valve shaft. Consequently, the valve operator mechanism must provide a mechanical advantage to overcome the torque, but it also must be capable of moving the vane or circular disk between predetermined limits for closing and opening the valve. Valve seats on this type of valve become worn after continued use and since the valve operator mechanism will move the disk or valve member only between predetermined limits of movement, leakage will occur when the seat is worn, as the valve member cannot be moved further than the limit set by the valve operator.

The invention, in its broadest aspect, includes a valve operator attached to a valve having a rotatable valve shaft, the valve operator including a housing member, an operating shaft journaled in the housing member and having threads on a portion of the same, follower means carried on the threads of the operating shaft and movable axially of the shaft when the shaft is rotated, means operatively connecting the follower means to the rotatable valve shaft of the valve and providing a mechanical advantage for rotating the valve shaft, and a pair of stop means for limiting movement of the follower means in one direction and in another direction, the pair of stop means being adjustable simultaneously by the adjustment of one stop means to adjust the limits of movement of the follower means so that when the valve has its valve member adjusted to properly close the valve, the valve member still has the same limits of movement between the fully closed position and the fully opened position. The adjustment means for one of the pairs of stop means adjust the axial position of the operating shaft with respect to its being journaled in the housing member and this adjustment means may be accomplished without disassembling the valve operator or removing the valve operator from the rotatable valve shaft of the valve.

Ancillary to the above broad aspects of the invention, it is a further object of the invention to provide a completely enclosed housing for the valve operator member whereby the chamber provided in the housing for the various elements of the valve operating member may be filled with a lubricant to insure easy operation of the valve operator member over long periods of time.

The valve operator of the present invention also contemplates a housing design whereby certain parts or elements of the valve operator which couple the follower means of the valve operator to the rotatable valve shaft of the valve are retained in position by the walls of the housing, thus, eliminating the necessity of set screws, keys and keyways, threaded connections, and the like and, indeed, this reduces the cost of manufacture and makes the assembly of the valve operator easier and more positive. In addition, the valve operator is provided with a coupler member for attachment to the valve shaft member, this coupler member being easily replaceable with other coupler means having diameters of different sizes for receiving different diameter rotatable valve shafts. By such an arrangement, one valve operator may be utilized for different size valves or, more specifically, valves having different diameter valve shafts, thus, reducing the inventory of a great number of different size valve operators.

BRIEF DESCRIPTION OF THE DRAWINGS

FIG. 2 is a side elevational view of FIG. 1 and partly in section, the view illustrating the valve operator of the present invention attached to the rotatable valve shaft of a butterfly valve, or the like.

DETAILED DESCRIPTION OF THE INVENTION

Figure 1:
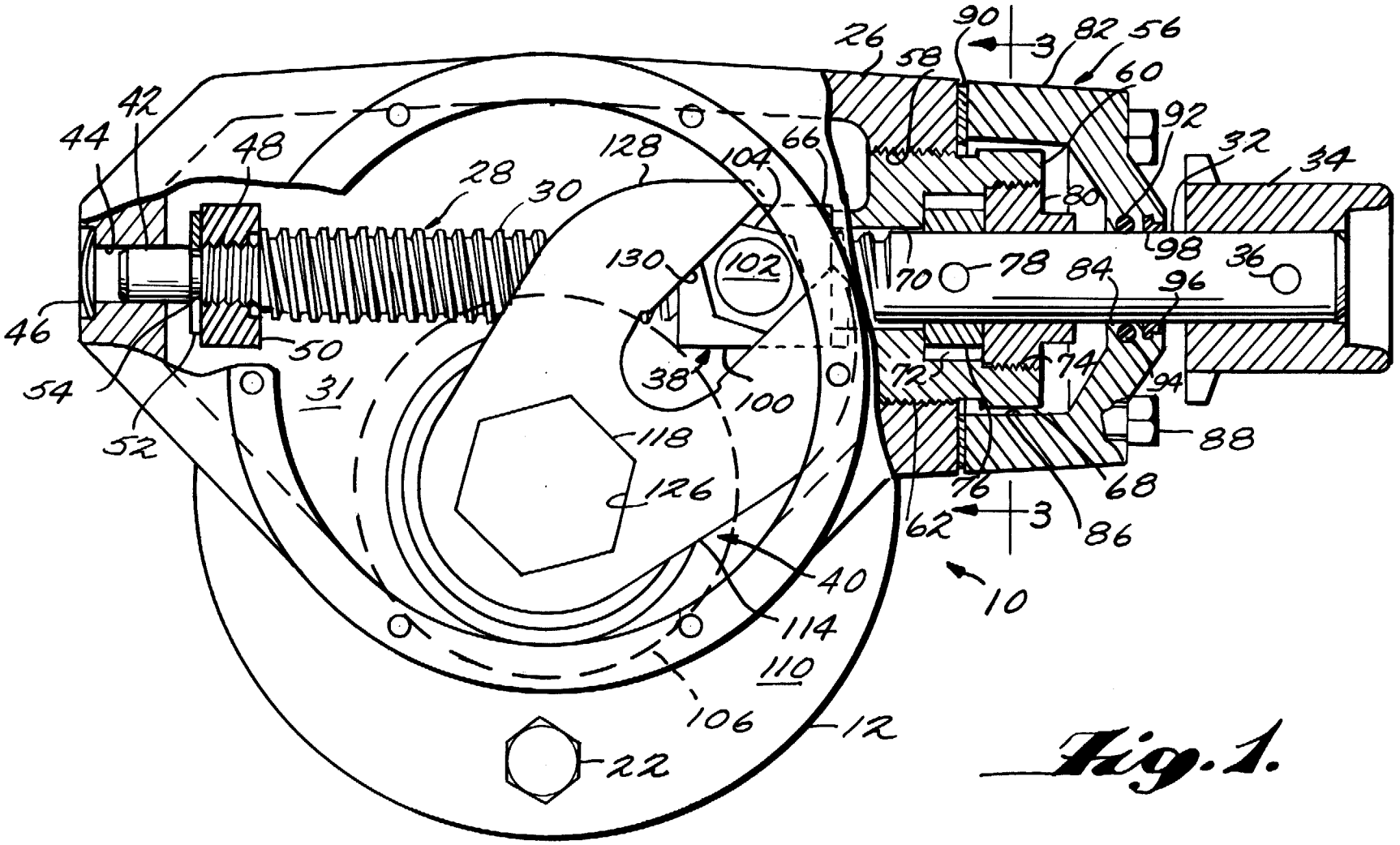
FIG. 1 is a top plane view of the valve operator of the present invention, partly in section, and with the cover plate removed from the housing so that the interior of the chamber of the housing may be seen.
Figure 2:
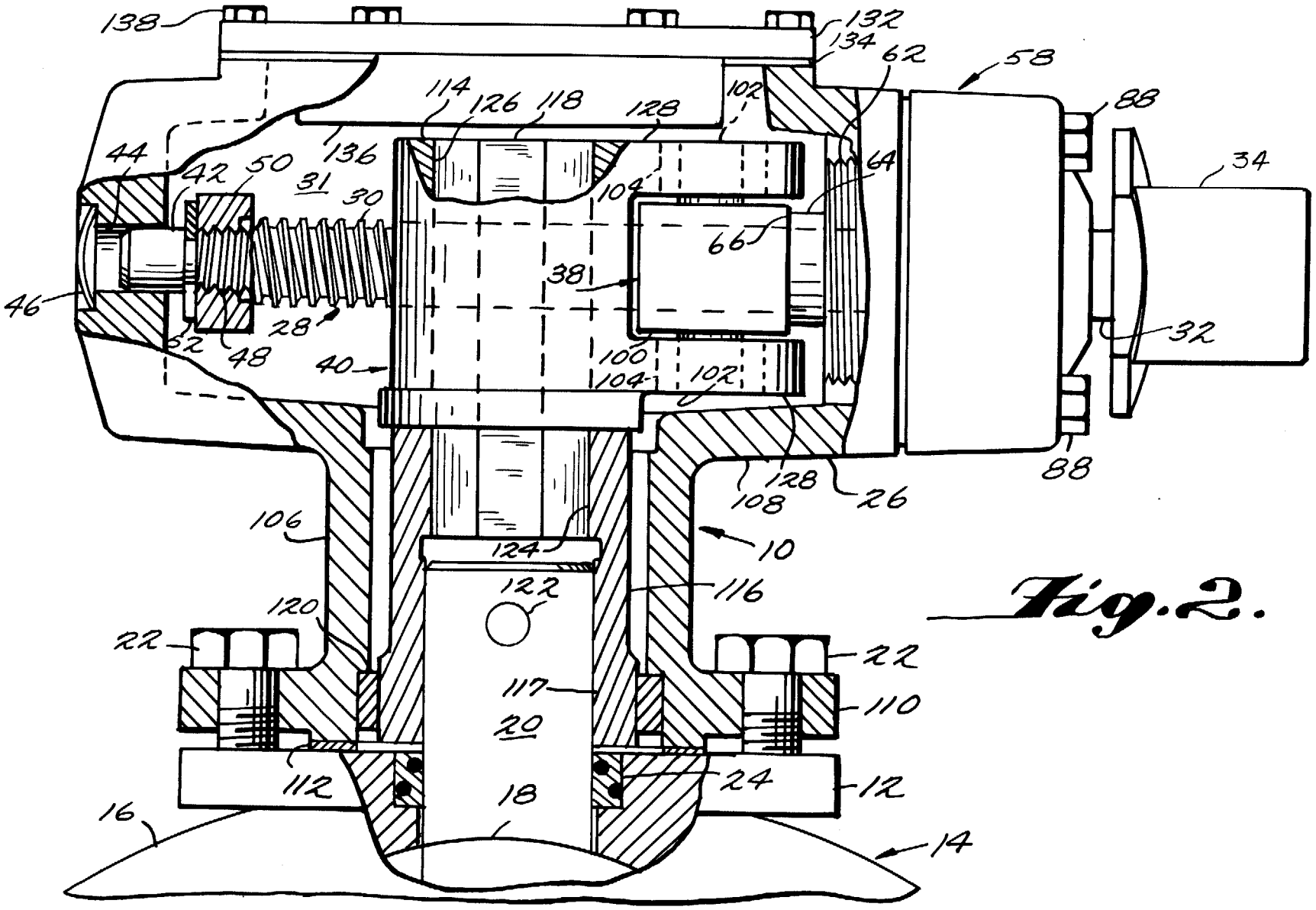

Referring now to the drawings wherein like characters or reference numbers represent like or similar parts, there is disclosed a valve operator mechanism of the present invention, generally designated at 10 in FIGS. 1 and 2. The valve operator mechanism 10 is shown mounted on the flanged upper end 12 (FIG. 2) of a butterfly valve, generally designated at 14, the butterfly valve 14 being shown schematically and having the usual housing 16 with a butterfly valve member 18, such as a disk or vane, the valve member having therein a rotatable valve shaft or stem 20 extending therefrom through the housing 16. Bolts 22 are used to fixedly connect the valve operator 10 to the butterfly valve 14. The seat of the butterfly valve is not shown, but, of course, it would be circular and arranged to cooperate with the valve member 18 of the butterfly valve. Sealing means 24, such as the ring having O-rings 24', surrounds the valve shaft or stem 20 and is provided in the flanged end 12 of the butterfly valve 14, the sealing means providing a suitable seal between the valve shaft 20 and the bore through the butterfly valve housing 16.

The valve operator 10 includes a housing member 26 having an operating shaft, generally designated at 28, journaled therein, the operating shaft provided with a thread 30 on its portion within the housing chamber 31 of the operator housing member 26. A portion of the operating shaft 28 extends out of the housing member 26, as indicated at 32, and is provided with an operating nut 34 held thereon by a drive lock pin 36, the nut being adapted to receive a wrench or other tool (not shown) for rotating the operating shaft or stem 28. In place of the operating nut 34, suitable electric drive means (not shown) could be attached to the portion 32 of the operating shaft 28 for rotating the same.

Follower means, generally designated at 38, are threadedly received on the threads 30 of the operating shaft 28, the follower means being arranged to move axially of the shaft between predetermined limits when the operating shaft is rotated, as will be described later in this specification. The follower means 38 is operatively connected by a connecting means, generally designated at 40, to the upper end of the rotatable valve shaft 20 and, thus, when the follower means moves axially along the thread 30 of the operating shaft or stem 28, arcuate movement of the connecting means 40 is translated into rotational movement which rotational movement is transferred to the valve shaft 20.

In more detail, the operating shaft 28, which is journaled at both ends in the housing member 26, is provided with a smooth end portion 42 rotatably supported in a bore 44 provided in one end portion of the housing member. The bore 44 is closed by a freeze plug 46, which also functions as a sealing means for sealing lubricant within the housing chamber 31. Threads 48 of opposite hand to the threads 30 of the operating shaft 28 are provided intermediate the threads 30 and the smooth end portion 42. A lever stop 50 is threaded onto the threads 48, the lever stop 50 being in the form of a nut member and limiting the travel of the follower means 38 in one direction. A split retaining ring 52, carried in a groove 54, retains the stop nut 50 on the threads 48. By having the threads 48 of opposite hand to the hand of the threads 30, the stop nut 50 will tend to tighten against the follower means 38 when the same abuts the stop nut so that load is not transferred directly to the retaining ring 52.

The opposite end portion 32 of the operating shaft or stem 28, which extends from the housing member, is also smooth. In this respect, the smooth end portion 32 is journaled in the opposite end housing member 26 by means of a novel adjustment means, generally designated at 56. Housing member 26 is provided with a threaded opening, as indicated at 58, which threadedly receives an adjustment collar 60 having threads 62 thereon with a reduced annular portion 64 facing inwardly into the housing chamber 31 and providing a spaced lever stop 66 for engaging the follower means and limiting its travel in a second direction. The adjustment collar 60 is provided outwardly of the threads 62 with a portion 68 having an exterior non-circular configuration which may be square, hexagonal, octagonal, elliptical, or the like in cross section. Adjustment collar 60 has a bore 70 therethrough with a counterbore 72, the outer end of the counter bore being threaded with threads 74 of opposite hand to the threads 30 of the operating shaft 28. A stem bushing member 76 is fixedly attached to the operating shaft 28, for example, by a drive pin 78 or the like, or by being integral with the shaft and it fits into the cavity created between the threads 74 and the innermost portion counterbore 72. A stem retainer nut 80 is threaded into the threads 74 and allows free rotation of the operating shaft 28 and the stem bushing member 76 carried thereby. When the thrust of the stem bushing member 76 is bearing against the retainer nut 80 due to the rotation of the operating shaft 28 in a particular direction, the threads 74, being counter to the threads 30, prevent the retainer nut 80 from being able to separate from the adjustment collar 60.

An adjustment cap member 82, which defines a detachable portion of the housing member 26, has a bore 84 therethrough and through which the smooth end portion 32 of the operating shaft extends, the cap member 82 being arranged to cover the adjustment collar 60. In this respect, the interior of the adjustment cap member 82 is of non-circular and substantially complementary configuration to the non-circular portion 68 of the adjustment collar 60, as indicated at 86, and there is sufficient clearance between the same to provide a "lost motion" type of connection between the two elements, as will be described later in this specification. The adjustment cap member 82 is attached to the housing by bolts 88 and a suitable gasket 90 is provided between the adjustment cap member and the body of the housing member 26. The bore 84 is provided with a groove 92 for receiving a seal 94 and a second groove 96 for receiving a wiper ring 98.

The follower means 38 includes an interiorly threaded operating nut 100, which may be either circular or square, or the like, in exterior cross sectional configuration. The operating nut 100 is provided with a pair of oppositely disposed pins 102 projecting therefrom, the pins 102 receiving a freely rotatable member 104 thereon which may have a peripheral configuration, which is nut like or ring like. Of course, in some instances, it may be desirable just to provide pins without the rotatable member 104.

The housing member 26 is provided with a tubular boss 106 extending from one sidewall 108 of the housing member, the tubular boss 106 terminating in a flanged end 110, which is arranged to be coupled with the flanged end 12 on the butterfly valve 14. The tubular boss 106 has an axis perpendicular to, but offset from, the axis of the operating shaft 28. A gasket 112 is provided between the flanged end 110 of the housing member 26 and the flanged end 12 of the butterfly valve 14.

The connecting means 40 includes a bellcrank or scotch yoke member 114 which is operatively connected to the rotatable valve shaft 20 by means of a tubular coupler member 116 and a non-circular shaft 118, which may be square, hexagonal, octagonal, elliptical, or the like. In more detail, the coupler member 116 is rotatably supported in the boss 106 by means of a bushing 120, the coupler member 116 having a bore 117 which fits over the upper end of the valve shaft member 20 and is pinned thereto by means of a drive pin 122 or otherwise suitably secured. The upper portion of the coupler member, as viewed in FIG. 2, is provided with a broached non-circular hole 124 complementary to the non-circular shaft 118. The bellcrank or scotch yoke member 114 is fixedly secured to the shaft 118 and this may be accomplished by providing a hole 126 broached therein which has a non-circular configuration complementary to the configuration of the shaft 118 and, as is now obvious, the shaft 118 couples the yoke member 114 to the coupler member 116, thus, operatively connecting the rotatable valve shaft 20 to the yoke member. The yoke member 114, which is bifurcated, is provided with upper and lower spaced arms 128 which extend on either side of the operating nut 100. Each of the arms 128 is provided with a slot 130 and, as shown in FIG. 1, the nut like members 104 rotatably carried on the pins 102 of the operating nut 100 are capable of sliding in the slot 130 when the operating shaft 38 is rotated, this movement causing pivoting of the yoke member 114 about the axis of the rotatable valve shaft 20.

As best shown in FIG. 2, the housing member 26 is provided with a removable cover plate 132 with a gasket 134 being provided between the cover plate 132 and the body of the housing member 26. Cover plate 132 is provided with an inwardly projecting circular member 136, which lies in close proximity of the upper surface of the yoke member 114. The circular member 136 defines a portion of the sidewall of the chamber 31 of the housing member 26, whereas, the opposite sidewall 108 of the housing member 26 also lies in close proximity to the lower surface of the yoke member 114. By such an arrangement, the nut like members 104, which are freely rotatable on the pins 102, cannot escape from the pins 102 once the cover plate 132 has been assembled on the body of the housing member 26, but yet they can have a slight axial movement on the pins. Additionally, the shaft 118, which has a slide fit with the non-circular openings 126 in the yoke member 114 and the opening 124 in the coupler member 116, cannot slide out of engagement with the two members 114 and 116, respectively, and yet it also can have slight axial movement.

The interior of the chamber 31 is filled with a lubricant, such as grease, a viscose oil, or the like, and since seals are provided completely about the housing member 26, such lubricants cannot leak therefrom. By providing a lubricant within the closed chamber 31, easy operation of the valve operator 10 is always insured.

The valve operator 10 is assembled on the butterfly valve 14 by first selecting the coupler member 116 having a proper size bore 117 for a particular size rotatable valve shaft 20. The coupler member 116 is pinned to the rotatable valve shaft 20, and the body of the housing member 26 is fitted over the coupler member 116 with the bushing 120 centering the coupler member in the tubular boss. The nut like members 104 are positioned on their respective pins 102 of the operating nut and the yoke member 114 has the slots 130 of its arms 128 slid into the nut like members 104. The opening 126 of the non-circular hole or yoke member 114 is aligned with the non-circular hole 124 in the coupler member 116. The shaft 118 of complementary non-circular cross section is then inserted into the aligned holes 126 and 124 and the adjustment collar 60 is rotated to a position where its stop engages or abuts the operating nut 38 when the butterfly valve [12] *14* is closed. The adjustment cap member 82 is then slid over the non-circular end portion 68 of the adjustment collar 60 and is bolted in position by the bolts 88 with the cover member 132 finally being assembled on the body of the housing member 26 by the bolts 138. The valve operator is then ready for operation to close or open the butterfly valve 14 by turning the wrench or operating nut 34 to rotate the operating shaft or stem 28. As will be apparent to those skilled in the art, the operating nut 100 of the follower means 38 will travel back and forth between the stop nut 50 and the stop 66, depending upon direction of rotation of the shaft or stem 28 and, thus, the valve shaft 20 is rotated back and forth between predetermined limits.

Figure 3:
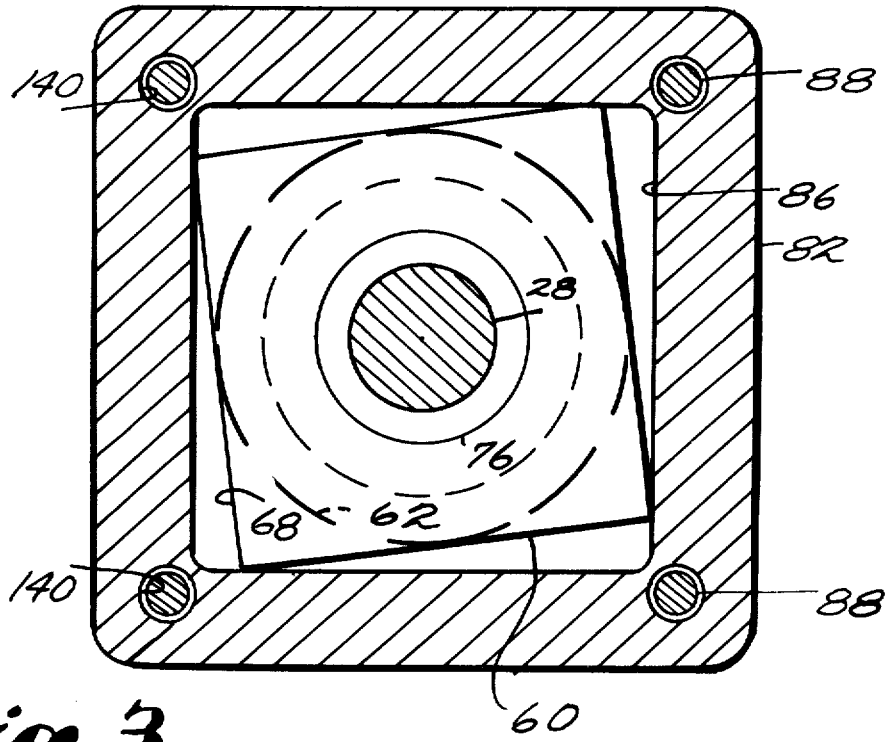
FIG. 3 is a sectional view taken generally on the line 3—3 of FIG. 1 and diagrammatically illustrating the adjustment means for adjusting the limit of travel of the follower means in one direction or the other.
Figure 4:
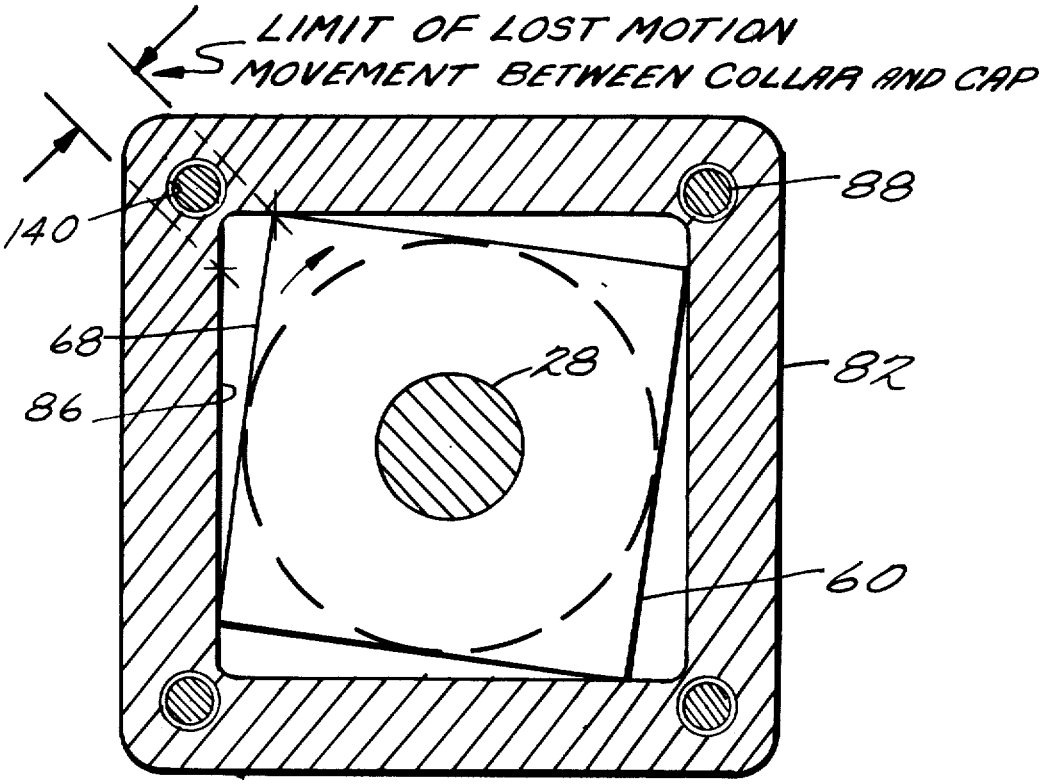
FIG. 4 is a sectional view similar to FIG. 3 and diagrammatically illustrating the maximum extent of "lost motion" movement between the adjustment cap and the adjustment collar.

Referring now to FIGS. 3 and 4, which are diagrammatic sectional views through the adjustment means 56, it may be assumed for the purposes of this description that after the assembly of the valve operator 10 on the butterfly valve [12] *14* and the initial adjustment has been made, the adjustment cap will be in a position on the upper portion 68 of the adjustment collar 60, as shown in FIG. 3. Of course, it could be such that the sides of the portion 68 of the adjustment collar 60 are parallel or substantially parallel to the sides 86 of the adjustment cap 82. Further assuming that at a subsequent time it is found that the seat of the butterfly valve 14 has worn and there is a leak in the fully closed position, adjustment of the stop 66 can be made simply by removing the bolts 88 from the adjustment cap 82 and rotating the adjustment cap 82 to cause the adjustment collar 60 to rotate and change the position of the stop 66, as well as the axial position of the operating shaft or stem 28, since the operating shaft or stem 28 is fixed relative to the bushing 76 and the bushing is, in turn, held captive in the adjustment collar 60 by the reaching nut 80. This adjustment can be made in the arrangement shown in FIG. 3 by a clockwise rotation of the adjustment cap 82, as its walls engage the corner portions of the portion 68 of the adjustment collar 60 or by a counterclockwise rotation which must first take up the "lost motion" before engagement of the corner portions 68 of the collar 60. It will be appreciated that the distance between the stop nut 50 and the stop 66 will not be changed, but both stops will be simultaneously moved in the same direction, thus, maintaining the limits of movement of the valve shaft 20 as initially set while adjusting the valve member [118] *18* to a position where it will properly close the valve [12] *14* .

The amount of rotation of the adjustment cap 82 depends on the amount of adjustment necessary for proper adjustment of the stops to provide proper seating of the valve. The adjustment cap 82 can be rotated a slight amount, as shown in FIG. 4, for a slight adjustment of the collar 60 or it can be moved in approximately one-quarter turns or for one or more full turns until proper adjustment of the collar 60 is reached. Because of the "lost motion" connection between the adjustment cap 82 and the adjustment collar 60, the cap 82 can be rotated in a desired direction once proper adjustment of the collar 60 has been made to realign its holes with the threaded holes in the body of housing member 26. FIG. 4 diagrammatically shows the limit of "lost motion" movement at a point of adjustment, but with the adjustment cap rotated backwardly so that the enlarged bolt holes 140 for the bolts 88 are realigned with the threaded holes (not shown) in the body of the housing member 26. It takes very little movement of the adjustment collar 60 and its stop 66 to provide satisfactory adjustment of the valve member as the moment arm caused by the yoke member multiplies the movement of the rotatable valve shaft 20. For example, in a 12 inch butterfly valve, the stop 66 can be moved 3/16 of an inch and give approximately ⅜ of an inch movement to the valve member 18 of the valve [12] *14* .

While the adjustment cap 82 has been shown as having oversized holes 140 for the bolts 88 to give some latitude in the realigning of the adjustment of the cap relative to the threaded bolt holes (not shown) in the body of the housing member 26, more adjustment could be made by making these holes 140 arcuate about the axis of the adjustment cap or, for that matter, the adjustment cap could be provided with more bolt holes in the same to allow for more latitude in the increments of adjustment of the stops 50 and 66 simultaneously in a desired direction.

As will now be apparent to those skilled in the art, the valve operator of the present invention provides an adjustment means which has at least a two fold desirable feature. First, both the opened and closed positions adjustments for the valves are simultaneously made with one very simple adjustment and with the distance, the follower means can travel on the operating stem being maintained to the predetermined distance set by the initial assembly and adjustment of the valve operator. Secondly, the adjustment means of the present invention can provide adjustment in the field without removing the inspection cover, internal locking devices, or without making separate adjustments to two limit stops, there being only the necessity of removing the four bolts and utilizing the cap member to make the adjustment and then rotating the cap member backwardly so that the bolts can be reinserted through the same into the body of the housing member 26. This feature is provided by the slight "lost motion" connection between the adjustment cap member and the adjustment collar. Further, the valve operator mechanism of the present invention provides a simplified arrangement which can be utilized for valves having different size rotatable valve shafts. This latter feature merely requires the selection of a coupler member having a proper size bore therein for receiving the rotatable valve shaft of a particular valve, the remaining dimensions of the coupler member being standardized for the valve operator.

The terminology used in this specification is for the purpose of description and not limitation, the scope of this invention being defined in the claims.

What is claimed is:

1. A valve operator for controlling the movement of and adjustably controlling the limits of such movement of a valve member carried by a rotatable valve shaft of a valve, said valve operator comprising:

a housing member associated with the valve and defining an enclosed chamber;

an operating shaft having one end portion extending through said housing and having threads on a second portion of the same within the housing;

means for supporting said operating shaft in an adjusted axial position and for rotatable movement, said means including an adjustable collar threadedly received in said housing and having an exterior non-circular configuration on a portion extending exteriorly of said housing, a stem bushing fixed to said operating shaft and a stem retainer nut carried by said adjustment collar and retaining said stem bushing axially fixed with respect to the adjustment collar;

an operating nut carried on the threaded portion of said operating shaft and movable axially on said operating shaft when said operating shaft is rotated;

stop means on said adjustment collar for engaging said operating nut and limiting its movement in one direction and a second stop means carried by said operating shaft for engaging said operating nut and limiting movement in an opposite direction;

means coupling the operating nut to the valve shaft for rotating the valve shaft;

and an adjustment cap having a non-circular interior configuration complementary to the non-circular exterior configuration of said adjustment collar and covering the same with an end portion of said operating shaft extending through the cap, said adjustment cap being bolted to said housing and having a slight lost motion play with said adjustment collar whereby said adjustment cap can be unbolted from said housing and rotated in one direction or the other to cause rotation of said adjustment collar to simultaneously adjust said first and second stop means and then rotated in reverse direction for rebolting without affecting the adjustment.

2. A valve operator as claimed in claim 1 in which said operating shaft has an end portion adjacent said second stop means supported in a closed bore in said housing.

3. A valve operator as claimed in claim 2 in which said closed bore is closed by a freeze plug.

4. A valve operator as claimed in claim 2 in which said second stop means includes a nut threaded onto said operating shaft by threads of an opposite hand to the threaded portion of said operating shaft.

5. A valve operator as claimed in claim 1 including a first sealing means between said adjustment cap and said housing and a second sealing means between the end portion of said operating shaft extending through said adjustment cap and the adjustment cap.

6. A valve operator as claimed in claim 1 in which said adjustment collar includes a counterbore for receiving said stem bushing and in which said stem nut is threadedly received in said adjustment collar and has threads of opposite hand to the threaded operating shaft.

7. A valve operator as claimed in claim 1 in which said means coupling the operating nut to said valve shaft includes a bifurcated yoke member having arms with slots therein and nut like members carried by pins on said operating nut and rotatable relative thereto, said nut like members being slideable in said slots when said operating nut rotates said yoke member.

8. A valve operator as claimed in claim 7 including a tubular boss extending from said housing member and having a flanged end for coupling with the valve, said tubular boss having an axis offset from and transverse to the axis of said operating shaft, a tubular coupler member rotatably carried in said boss and having a bore therethrough with one end portion adapted to fit over and be fixed to the valve shaft and the other end portion of non-circular configuration, said yoke member having a bore therethrough of non-circular configuration complementary to the non-circular configuration of the other end portion of said coupler member and a shaft of non-circular cross-section complementary to the non-circular configuration of said bores in said yoke member and said coupler member, respectively, said shaft extending through the bore in said yoke member into the non-circular bore of said coupler member to couple the valve shaft to the yoke member.

9. A valve operator as claimed in claim 8 in which said housing member has opposed sidewalls, at least a portion of each which respectively prevents said nut like members from being removed from said pins of said operating nut.

10. A valve operator as claimed in claim 9 in which at least one of said sidewalls is a detachable cover plate for permitting access to the enclosed chamber of said housing member.

11. A valve operator as claimed in claim 10 in which said enclosed chamber of said housing member is filled with lubricant means.

12. A valve operator as claimed in claim 7 in which said housing member has opposed sidewalls, a portion of each which respectively prevents said nut like members from being removed from said pins of said operating nut.

13. A valve operator for controlling the movement of a valve member carried by a rotatable valve shaft of a valve, said valve operator comprising:

a housing member for attachment to the valve, the housing member defining an enclosed chamber;

a rotatable operating shaft supported by said housing member against axial movement, said operating shaft having threaded portion within said enclosed chamber and another portion extending exteriorly of the housing member for receiving means to rotate the same;

a follower nut threadedly carried on the threaded portion of said operating shaft for movement axially of the operating shaft;

a bellcrank member having one end pivotally mounted on an axis spaced from and transverse of an axis of the operating shaft, and having its other end operatively connected to said follower nut for movement therewith;

means operatively connecting the said one end of said bellcrank member to the rotatable valve shaft, said last mentioned means including a tubular boss extending from said housing member and having an end for coupling with the valve, said tubular boss having an axis concentric with the pivot axis of said bellcrank member, a tubular coupler member rotatably carried in said boss and having a bore therethrough with one end portion adapted to fit over and be fixed to the valve shaft and the other end portion of non-circular configuration, said bellcrank member having a bore therethrough surrounding its pivot axis and of non-circular configuration complementary to the non-circular configuration of the other end portion of said coupler member, and a shaft fixedly connected to said bellcrank member and having a portion of non-circular cross-section complementary to the configuration of said bore in said bellcrank member and said coupler member, respectively, said shaft slideably extending through the non-circular bore in said bellcrank member into the non-circular bore of said coupler member whereby said valve shaft is rotated when said bellcrank member is pivoted by said follower member and whereby said coupler member may be interchanged with other coupler members for use with valves having particular size valve shafts.

14. A valve operator as claimed in claim 13 in which said housing member includes opposed sidewalls, one of which includes said tubular boss and the other of which includes a detachable cover plate which is provided with an interior surface closely positioned to an end of said shaft of noncircular cross-section for retaining said shaft in position in the bores of said bellcrank member and said coupler member.

15. A valve operator as claimed in claim 14 in which said coupler member is pinned to the valve shaft and may remain with the valve shaft when the valve operator is removed from said valve.

16. A valve operator as claimed in claim 15 including a bushing between said coupler member and said tubular boss.

17. A valve operator as claimed in claim 13 in which said rotatable operating shaft is supported at least adjacent both ends thereof and including first stop means adjustably supported by said housing about the end portion of said operating shaft which extends exteriorly of the housing member, said first stop means being arranged to abut and limit the movement of said follower means in one direction, and a second stop means fixedly carried on the other end of said operating shaft for abutting said follower means and limiting movement of the same in an opposite direction.

18. A valve operator as claimed in claim 17 in which adjustment of said first adjustable stop means also simultaneously adjusts said second stop means whereby overall movement of the valve member is maintained the same when adjustment is made to properly close the valve member.

19. In combination with a valve having a rotatable shaft for operating the valve between opened and closed positions, a valve operator for rotating said valve shaft comprising:

a housing member operatively connected to the valve;

an operating shaft journaled in said housing member and having threads on at least a portion of the same, said shaft including means to rotate the same;

a follower nut threadedly received on the threads of said operating shaft and movable axially of the same in one direction or the other, depending on rotation of the operating shaft;

means operatively connecting said valve shaft with said follower nut;

a first stop means for limiting movement of said follower nut in one direction;

a second stop means fixed to said operating shaft for limiting movement of said follower nut in an opposite direction;

and means adjustably supporting said first stop means in said housing member and operatively fixing said first stop means to said operating shaft, said adjustment means when operated to adjust said first stop means also simultaneously adjusting said second stop means whereby overall rotation of said valve shaft is maintained when said valve shaft is adjusted to properly close said valve.

20. The combination as claimed in claim 19 in which said adjustment means include an adjustment collar threadedly received in said housing member, a stem bushing fixed to said operating shaft, and a stem retainer nut carried by said adjustment collar and retaining said stem bushing axially fixed with respect to the adjustment collar.

21. The combination as claimed in claim 20 in which said adjustment collar has a non-circular configuration on a portion of the same extending exteriorly of said housing member, and including an adjustment cap having a non-circular interior configuration substantially complementary to the non-circular exterior configuration of the adjustment collar and covering the same, said adjustment cap being bolted to said housing member and having a slight lost motion play with said adjustment collar whereby said adjustment cap can be unbolted from said housing member and threaded in one direction or the other to cause rotation of said adjustment collar to simultaneously adjust said first and second stop means and the rotated in a reverse direction for rebolting without affecting the adjustment.

22. The combination as claimed in claim 21 in which said first stop means is integral with said adjustment collar.

23. The combination as claimed in claim 22 in which said second stop means include a nut threaded onto said operating shaft by threads having an opposite hand from the threads of said operating shaft.

24. A valve operator for controlling the movement of a valve member carried by a rotatable valve shaft of a valve, said valve operator comprising:

a housing member for attachment to the valve, the housing member defining an enclosed chamber;

a rotatable operating shaft supported by said housing member against axial movement, said operating shaft having a threaded portion within said enclosed chamber and another portion extending exteriorly of the housing member for receiving means to rotate the same;

a follower nut threadedly carried on the threaded portion of said operating shaft for movement axially of the operating shaft;

a bellcrank member having one end pivotally mounted on an axis spaced from and transverse of an axis of the operating shaft, and having its other end operatively connected to said follower nut for movement therewith;

means operatively connecting the said one end of said bellcrank member to the rotatable valve shaft, said last mentioned means including a tubular boss extending from said housing member and having an end for coupling with the valve, said tubular boss having an axis concentric with the pivot axis of said bellcrank member, a tubular coupler member rotatably carried in said boss and having a bore therethrough with one end portion adapted to fit over and be fixed to the valve shaft and the other end portion of non-circular configuration, and a shaft [of non-circular cross-section] *fixedly connected to said bellcrank member and having a portion* complementary to the non-circular configuration of said bore in said coupler member, said shaft slideably extending through the non-circular bore of said coupler member whereby said valve shaft is rotated when said bellcrank member is pivoted by said follower member and whereby said coupler member may be interchanged with other coupler members for use with valves having particular size valve shafts.

* * * * *